Nov. 5, 1957  P. G. JOHNSON  2,811,772
SPRING REMOVING AND APPLYING TOOL
Filed May 27, 1955
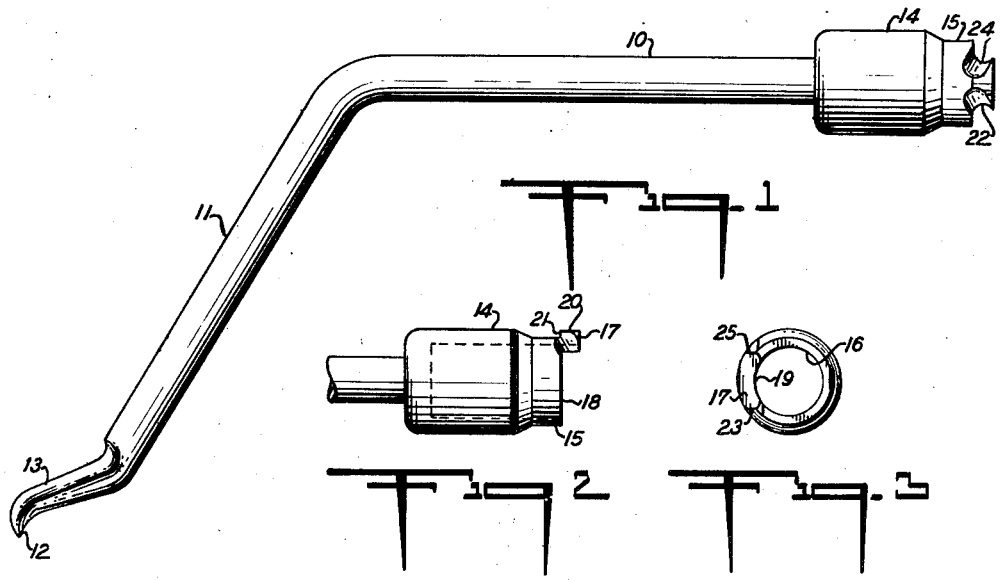
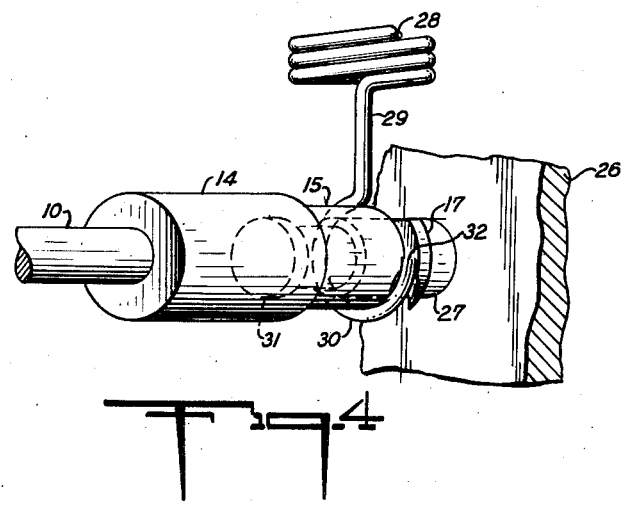
INVENTOR
PAUL G. JOHNSON
BY *Herbert J. Jacobi*
ATTORNEY United States Patent Office 2,811,772
Patented Nov. 5, 1957

2,811,772

SPRING REMOVING AND APPLYING TOOL

Paul George Johnson, Jamestown, N. Y.

Application May 27, 1955, Serial No. 511,536

8 Claims. (Cl. 29—227)

This invention relates to mechanic's hand tools and more particularly to an implement for facilitating the removal of the hooked shaped end of a spring from a spring retaining stud and for applying such hooked shaped end thereto.

In many instances, tension springs are provided with hook shaped ends which are anchored to a spring retaining stud and this structure is particularly prevalent in the brake automobiles. The springs in such applications are utilized to retract the brake shoes away from the brake drums after application of the brakes and when it is necessary to install new brake shoes, these retracting springs must be removed and replaced when the new brake shoes are installed. The working space for this operation is rather confined, in that, the surrounding parts, such as the brake shoes, the brake actuating cylinder and the axle are in relatively close proximity to the spring retaining studs and heretofore it has been common practice to perform this spring removing and replacing operation by utilizing pliers, particularly of the long-nose variety, and, as is well known, these pliers have a tendency to slip and either release the spring suddenly, or cause the user's hands to come in violent contact with the surrounding parts. This is a particularly difficult and vexing operation and often results in injury to the hands or fingers of the mechanic and likewise, the time consumed is quite frequently, out of all proportion to the magnitude of the operation involved. Consequently, any device or implement which permits the convenient removal and application of such springs in this brake repairing operation and also in other operations where such springs are utilized, represents an important step forward in the art and materially contributes to the speed and efficency of the repair operation involved, to say nothing of contributing to the disposition of the mechanic performing the repair operation.

It is accordingly an object of this invention to provide a relatively simple, hand-manipulated tool for conveniently removing tension springs from anchoring or retaining studs and for applying such springs thereto.

A further object of the invention is the provision of a smiple hand-manipulated tool for removing springs of the tension variety from studs to which the same are secured and which tool is operable regardless of which direction the spring anchoring hook extends around the retaining stud.

A still further object of the invention is the provision of a hand-manipulated spring removing and applying tool which will quickly and conveniently remove or apply a spring to a retaining or anchoring stud and, at the same time, positively prevent inadvertent release of the spring thereby preventing damage to surrounding parts and injury to the mechanic.

Another object of the invention is the provision of a hand-manipulated spring removing and applying tool which may be of such size as to be conveniently carried in a mechanic's tool box or tool tray.

Further objects and advantages of the invention will be apparent from the following description taken in conjunction with the accompanying drawing wherein:

Fig. 1 is a side elevational view of a spring removing and applying tool constructed in accordance with this invention;

Fig. 2, a fragmentary elevational view showing the operative portion of the tool in another position;

Fig. 3, an end elevational view of the operative end of the tool shown in Fig. 1; and Fig. 4, a fragmentary view in perspective showing the manner of operation of the spring removing and applying tool of this invention.

With continued reference to the drawing, the spring removing and applying tool of this invention may well comprise a shank 10 formed of an elongated bar or rod of steel or other suitable material and, at one end, such shank 10, may be provided with a laterally extending or offset portion 11 which may be grasped in the hand of the operator to permit convenient rotation of the shank 10. The offset or laterally extending portion 11 may be provided at the end thereof, with a bent lip 12 and an axially extending groove 13 in the side opposite to the lip 12 which may be utilized in a spring removing and applying operation, but which portion of the implement or tool provides no part of the instant invention and is described only for the purpose of providing a complete description of the tool, as illustrated.

Fixed to the opposite end of the shank 10 from the laterally extending or offset portion 11 is a substantially cylindrical body 14 which is considerably enlarged from the diameter of the shank 10 and which body 14, is provided at the forward end thereof, with a reduced portion 15. An axial bore 16 is provided in the body 14 and the purpose of such bore will be presently described.

An arcuate lip 17 extends outwardly from the end face 18 of the reduced portion 15 on the body 14 and the inner surface 19 of the lip 17 constitutes a continuation of the bore 16. The outer surface 20 of the lip 17 extends outwardly of the reduced portion 15 to provide a shoulder 21 and a spiral groove 22 extends through the shoulder 21 from the end 23 of the lip 17. If desired, a second spiral groove 24 may extend from the opposite end 25 of the lip 17 through the shoulder 21. The purpose and operation of these spiral grooves will be presently described.

The manner of operation of the tool of this invention is shown in Fig. 4, and, for purposes of illustration only, there is shown a plate 26 which may well comprise the back plate of a brake assembly commonly supplied on conventional automobiles, and extending from the surface of plate 26, is a spring retaining stud or anchor post 27. A tension spring 28 is provided with a straight portion 29 which terminates in a hook 30 and such hook is disposed around the stud or anchor pin 27 to retain the hook 30 and spring 28 in place and the stud 27 may be provided with a head 31 to prevent inadvertent separation of the hook 30 from the pin or stud 27.

As shown in Fig. 4, the tool of this invention is operated to remove the hook 30 of the spring 28 from the stud 27 by inserting the stud 27 in the bore 16 of the body 14 of the spring removing tool 17 disposed between the end 32 of the hook 30 and the straight portion 29 of the spring 28. Upon rotation of the body 14 by moving the laterally extending or offset portion 11 the end 32 of the hook 30 enters the spiral groove 22 and continued rotation of the body 14 and lip 17 results in positioning the hook 30 rearwardly of the shoulder 21 and about the reduced portion 15. At this time, the hook 30 is completely disengaged from the stud or pin 27 and outward axial movement of the tool results in removing the hook 30 and spring 28 from the stud 27. If it so happens that the hook 30 extends around the stud 27 in the opposite direction from that shown in Fig. 4, the tool may be rotated in the opposite direction, in which case the spiral groove 24 will be utilized to engage the hook 30 move the same rearwardly of the shoulder 21 and about the reduced portion 15.

Application of the hook 30 of the spring 28 to the stud 27 is accomplished in substantially the reverse manner by positioning the hook 30 about the reduced portion 15 and rearwardly of the shoulder 21, whereupon the tool is disposed over the stud 27 with such stud received in the bore 16 and upon rotation of the tool in the opposite direction from the removing operation, the hook 30 will engage the spiral groove 22 and be moved from the reduced portion 15 into engagement with the stud 27 whereupon the tool may be removed therefrom.

The tool of this invention may be utilized to remove or apply springs in the manner above described, and with no danger, whatsoever, of the spring being inadvertently released thereby preventing damage to surrounding parts and injury to the mechanic performing the operation. Furthermore, by use of the tool of this invention, the operation of applying and removing springs of the character under consideration is materially facilitated thereby resulting in reduced time required for repair operations and materially increasing the work output of mechanics engaged in this type of work. The spring removing and applying tool may be economically constructed of readily available material and without requiring extremely accurate or precision machining operations, thereby resulting in a tool which may be sold at a relatively low cost in a highly competitive market.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A tool of the character described comprising a shank having a laterally disposed portion to facilitate turning of said shank, an enlarged body fixed to one end of said shank axially thereof and having a reduced portion at the free end, an axial bore in said body for receiving a spring retaining stud, a projecting arcuate lip on the free end of said body, the inner surface of said lip constituting a continuation of said bore and the outer surface of said lip projecting outwardly of the adjacent surface of said reduced portion to provide a shoulder and a spiral groove in said lip tapering to a thin leading edge and extending at a diagonal from one end of said lip through said lip and said shoulder and into said reduced portion, whereby a spring retaining stud may be disposed in said bore with said lip disposed between the ends of a spring attaching hook disposed on said stud and upon rotation of said body said hook will engage in said spiral groove to move said hook rearwardly into engagement with said reduced portion to facilitate removal of said hook from said stud.

2. A tool as defined in claim 1 in which a second spiral groove extends at a diagonal from the opposite end of said lip through said lip and said shoulder and into said reduced portion.

3. A tool of the character described comprising a shank, an enlarged body fixed to one end of said shank axially thereof and having a reduced portion at the free end, an axial bore in said body for receiving a spring retaining stud, a projecting arcuate lip on the free end of said body, the inner surface of said lip constituting a continuation of said bore and the outer surface of said lip projecting outwardly of the adjacent surface of said reduced portions to provide a shoulder and a spiral groove in said lip tapering to a thin leading edge and extending at a diagonal from one end of said lip through said lip and said shoulder and into said reduced portion, whereby a spring retaining stud may be disposed in said bore with said lip disposed between the ends of a spring attaching hook disposed on said stud and upon rotation of said body said hook will engage in said spiral groove to move said hook rearwardly into engagement with said reduced portion to facilitate removal of said hook from said stud.

4. A tool of the character described comprising a shank, a body fixed to one end of said shank axially thereof and having a reduced portion at the free end, an axial bore in said body for receiving a spring retaining stud, a projecting arcuate lip on the free end of said body, the inner surface of said lip constituting a continuation of said bore and the outer surface of said lip projecting outwardly of the adjacent surface of said reduced portion to provide a shoulder and a spiral groove in said lip tapering to a thin leading edge and extending at a diagonal from one end of said lip through said lip and said shoulder and into said reduced portion, whereby a spring retaining stud may be disposed in said bore with said lip disposed between the ends of a spring attaching hook disposed on said stud and upon rotation of said body said hook will engage in said spiral groove to move said hook rearwardly into engagement with said reduced portion to facilitate removal of said hook from said stud.

5. A tool of the character described comprising a shank, a body fixed to one end of said shank axially thereof and having a reduced portion at the free end, an axial bore in said body for receiving a spring retaining stud, a projecting lip on the free end of said body, the inner surface of said lip constituting a continuation of said bore and the outer surface of said lip projecting outwardly of the adjacent surface of said reduced portion to provide a shoulder and a spiral groove in said lip tapering to a thin leading edge and extending at a diagonal from one end of said lip through said lip and said shoulder and into said reduced portion, whereby a spring retaining stud may be disposed in said bore with said lip disposed between the ends of a spring attaching hook disposed on said stud and upon rotation of said body said hook will engage in said spiral groove to move said hook rearwardly into engagement with said reduced portion to facilitate removal of said hook from said stud.

6. A tool of the character described comprising a shank, a body fixed to one end of said shank axially thereof, an axial bore in said body for receiving a spring retaining stud, a projecting lip on the free end of said body, the inner surface of said lip constituting a continuation of said bore and the outer surface of said lip projecting outwardly of the adjacent surface of said body to provide a shoulder and a spiral groove in said lip tapering to a thin leading edge extending at a diagonal from one end of said lip through said lip and said shoulder whereby a spring retaining stud may be disposed in said bore with said lip disposed between the ends of a spring attaching hook disposed on said stud and upon rotation of said body said hook will engage in said spiral groove to move said hook rearwardly into engagement with said body to facilitate removal of said hook from said stud.

7. A tool of the character described comprising a shank, a body fixed to one end of said shank axially thereof, an axial bore in said body for receiving a spring retaining stud, a projecting lip on the free end of said body, the outer surface of said lip projecting outwardly of the adjacent surface of said body to provide a shoulder and a spiral groove in said lip tapering to a thin leading edge and extending at a diagonal from one end of said lip through said lip and said shoulder whereby a spring retaining stud may be disposed in said bore with said lip disposed between the ends of a spring attaching hook disposed on said stud and upon rotation of said body said hook will engage in said spiral groove to move said hook rearwardly into engagement with said body to facilitate removal of said hook from said stud.

8. A tool as defined in claim 7 in which a second spiral groove extends at a diagonal from the opposite end of said lip through said lip and said shoulder.

No references cited.